J. H. COWLISHAW.
FOLDING BONNET BOX.
APPLICATION FILED APR. 2, 1914.

1,148,502.

Patented Aug. 3, 1915.
3 SHEETS—SHEET 1.

Witnesses
S. H. Clarke
R. W. Edwards

Inventor
John H. Cowlishaw
By Louis M. Schmidt
Atty.

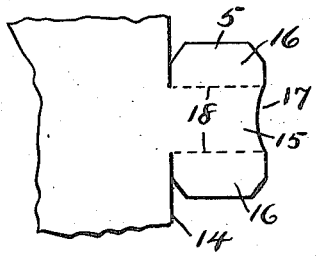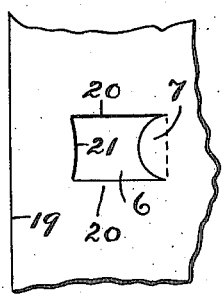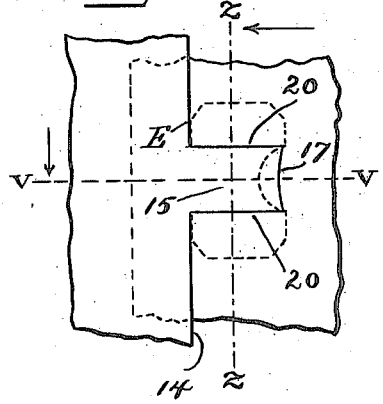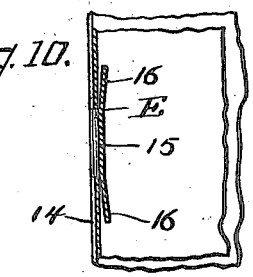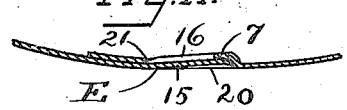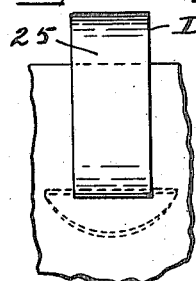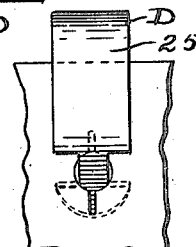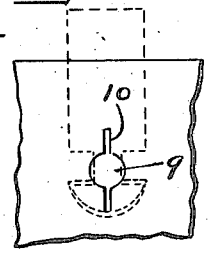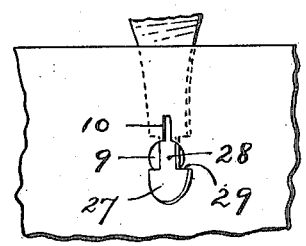

J. H. COWLISHAW.
FOLDING BONNET BOX.
APPLICATION FILED APR. 2, 1914.
1,148,502.
Patented Aug. 3, 1915.
3 SHEETS—SHEET 3.
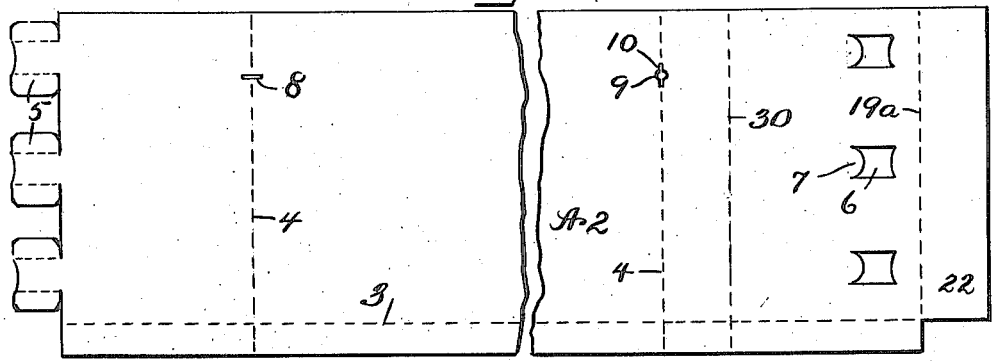
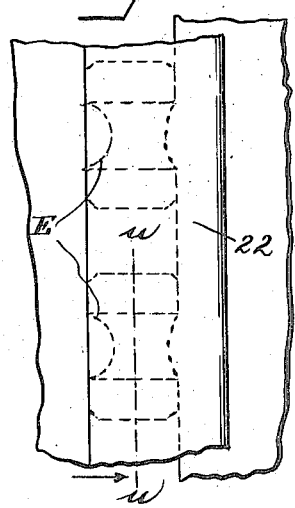
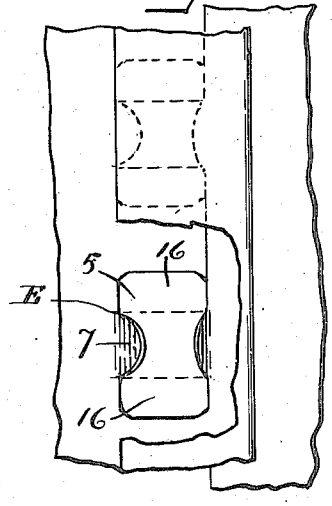
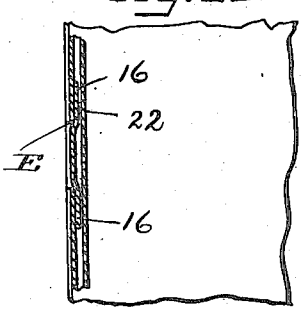
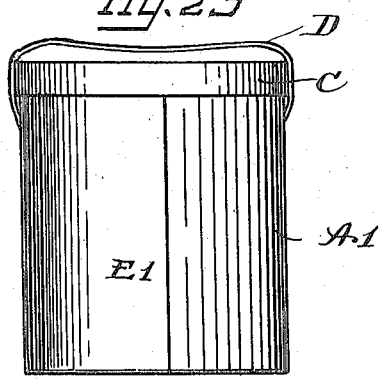
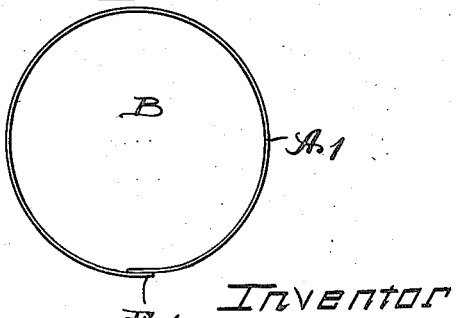
Witnesses
S. H. Clarke
R. W. Edwards
Inventor
John H. Cowlishaw
By Louis M. Schmidt
Atty.

UNITED STATES PATENT OFFICE.

JOHN H. COWLISHAW, OF NEW BRITAIN, CONNECTICUT.

FOLDING BONNET-BOX.

1,148,502.

Specification of Letters Patent. Patented Aug. 3, 1915.

Application filed April 2, 1914. Serial No. 828,998.

*To all whom it may concern:*

Be it known that I, JOHN H. COWLISHAW, a citizen of the United States, residing at New Britain, in the county of Hartford and State of Connecticut, have invented certain new and useful Improvements in Folding Bonnet-Boxes, of which the following is a specification.

My invention relates to improvements in folding bonnet boxes, and the object of my improvement is to produce a box of the type known as a bonnet or hat box that is collapsible and can readily be knocked down so as to facilitate packing and shipping and which can also be readily reassembled and brought into a condition for use.

Figure 1:
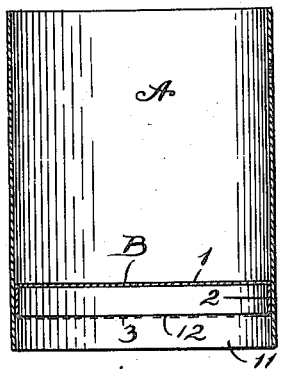
Figure 2:
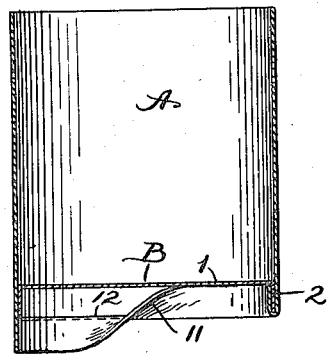
Figure 3:
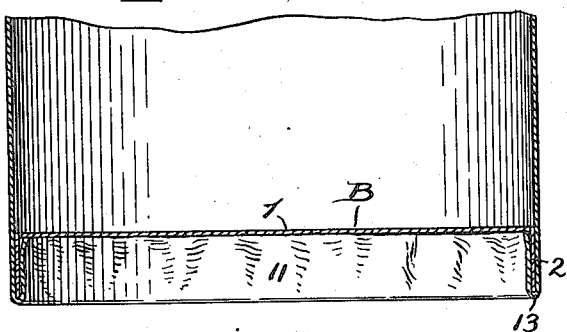
Figure 4:
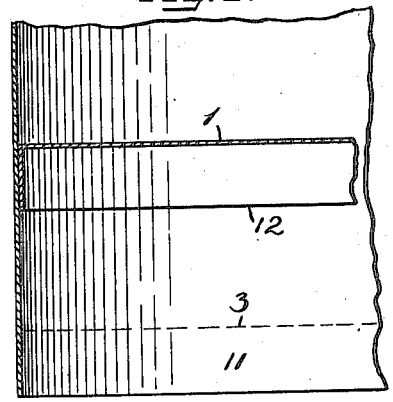
Figure 5:
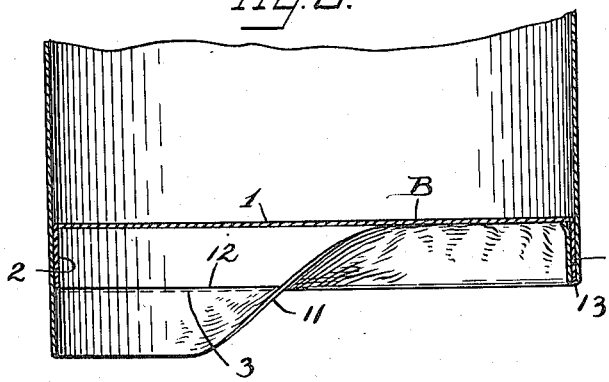
Figure 6:
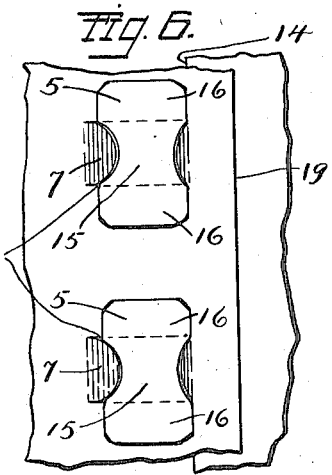

In the accompanying drawing:—Figure 1 is a sectional view of my improved folding bonnet box, the cover being omitted, the bottom being in normal position, and the side wall with the folding lip being in the open or extended position. Fig. 2 is a similar view of the same with part of the folding lip of the side wall turned to the holding position. Figs. 3, 4 and 5 are similar fragmentary views, on an enlarged scale, of certain parts shown in Figs. 1 and 2, in different conditions of assembly. Fig. 6 is a side elevation of part of the side wall as viewed from the inside, showing the locking members in engagement. Fig. 7 is a side elevation of the tongue member shown in Fig. 6. Fig. 8 is a corresponding view of the mating locking member showing the loop and lip. Fig. 9 is a corresponding view of the locking members in engagement, as viewed from the outside. Fig. 10 is a sectional view on the line z z of Fig. 9. Fig. 11 is a sectional view on the line v v of Fig. 9. Fig. 12 is a side elevation of part of the side wall of the box handle as viewed from the side of the large end of the handle. Fig. 13 is a similar view as viewed from the side of the small end of the handle. Fig. 14 is a similar view of the same with the handle removed, the position of the handle being indicated by broken lines. Fig. 15 is a similar view of the same as viewed from the inside of the box and with the small end of the handle entered part way into the entrance slot. Fig. 16 is a plan view of the handle. Fig. 17 is a similar view of the same with the small end of the handle turned 90 degrees from the normal position. Fig. 18 is a side elevation on the same scale as Fig. 1 of a modification of the side wall of my box, showing a guard for a lock, such as shown in Fig. 6. Fig. 19 is an interior view on the same scale as Fig. 6 of part of the side wall shown in Fig. 9 in locked position. Fig. 20 is a similar view of the same with the guard partially broken away. Fig. 21 is a plan view of the same. Fig. 22 is a sectional view on the line u u of Fig. 19. Fig. 23 is a front elevation on the same scale as Fig. 1 of a box showing another modification of the side wall. Fig. 24 is a plan view of the same with the handle and cover removed.

My folding box is formed of sheet material and comprises a side wall A, a bottom B, a cover C and a handle D. The cover C fits over the side wall A and is ordinary. The side wall A comprises a single piece of sheet material of rectangular formation having the ends overlapping and secured together in some suitable manner so as to form an endless structure as by means of a plurality of locks E in the style shown in Fig. 6 or by having the overlapping ends $E^1$ secured by cement as in the side wall $A^1$ in the modification shown in Fig. 24. The side wall A is provided with a score line 3 an appreciable distance above the bottom edge and with a pair of score lines 4 and 30 extending longitudinally of the body of the box or cross-wise relatively to the blank as shown in Fig. 18. The lower portion 11 of the side wall A between the score line 3 and the bottom edge of the blank serves as a folding lip. The locks E comprise locking flaps 5 extending from one end of the side wall A and coöperating means therefor at the other end comprising a hole 6 and a tongue 7. Handle receiving means are provided comprising a laterally extending slot 8 in the side wall A at one side and a key hole slot at the other side comprising a circular hole 9 and a slot 10 extending across the same longitudinally of the side wall so as to provide two wings or branches, one above and the other below the said circular hole 9.

The bottom B comprises a circular bottom proper 1 of suitable size to fit across the space inclosed by the side wall A and a cylindrical flange 2 extending downwardly from the lateral edges of the bottom portion 1 and of a depth corresponding to the distance of the score line 3 from the bottom edge of the side wall A. The bottom B is inserted within the side wall A preferably from the top, as indicated in Fig. 4, and brought to the bottom position with the lower edge 12 of the flange 2 in line with or just above the circumferentially extending score line 3 of the side wall A, as indicated in Fig. 1. Then the folding lip 11 is turned upwardly and inwardly as partially shown in Fig. 2 and shown complete in Fig. 3 so as to lie against the inner wall of the flange 2. In this position the bottom edge 12 of the flange 2 or bottom B rests on the apex 13 of the turned up bottom portion of the side wall A. The said apex 13 formed by turning up the lower edge or lip 11 of the said wall A serves as a support for the bottom B.

The lock E consists of the flap or tongue 5 on one member (see Fig. 7) and the hole 6 and lip 7 on the other member (see Fig. 8). The tongue 5 overhangs the free edge 14 of the blank forming the side wall A and comprises a central body portion 15 and a pair of lateral wings 16 one on each side thereof. The free edge of the tongue 5 may be notched as shown at 17 for convenience in opening the lock E. The wings 16 are flexibly connected to the body portion 15 along the score lines 18. The hole 6 and lip 7 that engage with the tongue 5 are spaced slightly inward from the free edge 19 of the end of the blank A remote from the tongue 5. The hole 6 is of approximately the same dimensions as the body portion 15 of the tongue 5 so that the wings 16 may be grasped with a thumb and finger and flexed along the score lines 18 so as to be entered under the side walls 20 of the said hole 6 and with the end 17 of the body portion 15 overlying the lip 7, which is positioned at the inner end of the hole 6. The outer wall 21 of the hole 6 has a curved edge forming a diminutive lip for supporting the inner edge of the body portion 15 at the junction thereof with the body portion of the side wall A. When the lock E is closed, as shown in Figs. 9, 10 and 11, the wings 16 are positioned in the interior space within the side wall A.

In the modification of the side wall $A^2$ shown in Fig. 18 a shield 22 is provided for covering the wings 16 in the locked condition, as shown in Figs. 19, 20, 21, and 22. The shield 22 is connected along the score line $19^a$ to the side having the hole 6 and lip 7, the said score line $19^a$ corresponding to the free edge 19 of the blank A, and is bent by a return bend along the said score line $19^a$ so as to cover the said wings 16 and lips 7 when the lock E is closed as shown in Figs. 19, 20, 21 and 22.

Another modification of the side wall $A^1$, is shown in Figs. 23 and 24, having in lieu of the lock E overlapping ends $E^1$, permanently secured together in any ordinary manner, as by cement. The bottom B is substantially the same for the different side walls described and is inserted in the manner described. The cover C is ordinary, having a circular body portion and a cylindrical lip depending from the outer edge thereof and fitting over the side wall. Accordingly, the bottom B may be nested in the cover C, which may be a convenience in shipment.

The handle D consists of an elongated strip of flexible material having parallel side walls for the body portion 25, and of suitable width to pass through the lateral slot 8 in the side wall A. At one end there is a head 24 that is appreciably larger or wider than the body portion 25 so as to provide laterally disposed lugs or shoulders 26 suitable for engaging with the end walls of the said slot 8. At the other end there is a smaller head 27 connected to the body portion 25 by a neck 28. The said head 27 has an overall width approximately equivalent to that of the body portion 25 and therefore is suitable for entering and passing through the lateral slot 8 and also the cross-wise or vertical slot 10, which is of about the same length as the slot 8, and the neck 28 is of a width slightly smaller than the diameter of the hole 9, suitably to turn therein.

The handle D is passed through the lateral slot 8 to the extent of the body portion 25 from the inside of the side wall A, the small head 27 first, so that the shoulders 26 of the head 24 engage with the side walls of the said slot 8. Then the body portion 25 is twisted, as shown in Fig. 17 so that the small head 27 is positioned at right angles to the normal position, the body portion 25 being positioned over the top of the box proper or the cover C and the small head 27 is entered in the vertical, cross-wise slot 10 until the neck 28 is positioned in the hole 9 when the small head 27 is released and the body portion permitted to resume the normal form, whereupon the small head 27 will assume a position approximately horizontally across the hole 9 so that the shoulders 29 on the head 27 adjacent the neck 28 will engage with the side walls of the said hole 9, as shown in Figs. 13 and 14. In Fig. 15 is shown an intermediate position of the small head 27.

As described, the bottom B and handle D are separable from the side walls A, $A^1$ and $A^2$ and these parts may be readily assembled therewith in condition for use and may be readily disassembled and separated therefrom. When so separated, the side walls are readily collapsed. With the parts of the locks E in the engaged position the side wall A is collapsed along the score lines 4, which happen to correspond to the positions of the lateral slot 8 on one side and the key hole slot at 9 and 10 on the other side.

By disengaging the locks E and bending one side a little shorter the free edge 19 may be positioned to one side of the tongue 5, avoiding the overlapping feature of the lock E and permitting greater compactness when piled one above the other. In this case the right hand end shown in Fig. 18 is bent along the score line 30. This is a convenience in shipment.

I claim as my invention:—

1. A folding box comprising a side wall and a separable bottom, the said side wall being formed of sheet material, of rectangular shape, and having the ends secured together to form an endless structure, the said bottom fitting across inside the said side wall, the lower edge portion of the said side wall being in the form of a folding lip suitable for being turned inwardly and upwardly within the body portion of the said side wall in position to engage with the said bottom, and the said folding lip being of appreciable depth so as to extend appreciably upwardly from the lower edge by which it is connected to the said body portion and also being in the form of a continuous strip from end to end along the said edge, whereby the said lip when turned inwardly and bearing against the said bottom is operative on account of the continuity and depth thereof and the inherent rigidity of the material to offer appreciable resistance to buckling, so as to provide a support for the said bottom, independent of other supporting means.

2. In a folding box having a side wall of generally rectangular form, the ends being suitable to overlap to form an endless structure, locking means for the said ends comprising in part locking wings that are exposed on the inside of the said side wall, the said wings being on one of the said ends that overlap, and a shield on the other of the said ends, serving as a cover for the said wings, and the said shield being connected to the said other end so as to form a return bend therewith.

3. A folding box comprising a side wall and a separable bottom, the said side wall being formed of sheet material, of rectangular shape, and having the ends secured together to form an endless structure of generally cylindrical form, and being divided by a folding crease into a main portion and a folding lip portion, the said bottom fitting across the interior of the said structure, and the said side wall having a pair of longitudinal folding creases extending across the said main portion and folding lip portion, positioned at diametrically opposite points, so that the said side wall may be collapsed, with opposed walls in abutment, and may be opened out into position to receive the said bottom.

4. In combination in a box having a side wall, a handle in the form of a strip of uniform width for the body portion, having an enlarged head at one end and a head at the other end of the width of the said body portion and connected to the said body portion by a reduced neck, and the said side wall having a slot at one side that is a fit for the said body portion and having at the other end a key hole slot suitable for engagement with the said second head.

5. A box having a side wall, and a handle, the said side wall having a straight sided lateral slot at one side and a key hole slot on the other side comprising a circular central portion and a cross-wise slot extending across the same of about the same length as the said lateral slot, and positioned vertically, and the said handle being formed of sheet material, and comprising a body portion of a width such as to be a sliding fit within the said slots one end of the said handle having a head that is enlarged relatively to the said body portion, and the other end of the said handle comprising a smaller head of a width such as to be a sliding fit in the said cross-wise slot, and the said smaller head being connected to the said body portion by a reduced neck of a width suitable for turning in the said central circular portion of the key hole slot.

JOHN H. COWLISHAW.

Witnesses:
 SHEFFIELD H. CLARKE,
 ROGER W. EDWARDS.